United States Patent Office 3,390,102
Patented June 25, 1968

3,390,102
REDUCTION-ACTIVATION OF COPPER OXIDE-ZINC OXIDE LOW TEMPERATURE SHIFT CATALYSTS
Ronald E. Reitmeier, Middletown, Ky., assignor to Catalysts & Chemicals, Inc., Louisville, Ky., a corporation of Delaware
No Drawing. Continuation-in-part of application Ser. No. 422,452, Dec. 30, 1964. This application Dec. 1, 1966, Ser. No. 598,168
8 Claims. (Cl. 252—475)

ABSTRACT OF THE DISCLOSURE

Copper oxide-zinc oxide catalyst precursors made for use in low temperature shift reactions wherein carbon monoxide and steam are reacted are very difficult to reduce in large scale commercial operations. Maximum activity catalysts can be made by reduction under controlled conditions using a low concentration hydrogen or carbon monoxide reducing gas in a diluent gas, and incrementally increasing the concentration of hydrogen or carbon monoxide in the diluent gas to control the temperature which increases proportionally to the hydrogen or carbon monoxide concentration.

This application is a continuation-in-part of my application Ser. No. 422,452, filed Dec. 30, 1964, now abandoned, which is a continuation-in-part of application Ser. No. 330,530, filed Dec. 16, 1963, now abandoned.

This invention relates to catalysts for the reaction of carbon monoxide with steam, which is conducted at temperatures below 700° F., such catalysts containing zinc oxide and copper oxide as their active ingredients. In its more specific aspect, the invention pertains to the activation of such catalysts by the reduction of the zinc oxide-copper oxide catalyst precursor.

U.S. 2,580,068 discloses reduced copper-zinc catalysts as dual purpose catalysts for purifying gases by removing sulfur compounds and carbon monoxide from such gases.

U.S. 1,797,426 relates to the use of copper-zinc catalysts as shift catalysts. These catalysts are reduced in situ with either hydrogen by itself, or a mixture of steam with carbon monoxide. However, U.S. 1,797,426 is not directed to catalysts operating at low temperatures.

Certain copper-zinc catalysts are also described in British Patent 636,800. These catalysts were also reduced with hydrogen alone; but the catalysts are not shift catalysts. The reduction of copper oxide-zinc oxide shift catalysts is thus not disclosed at length in the prior art.

In low temperature shift reactions, the activity of a copper-zinc catalyst is in large measure dependent upon the method by which the catalyst precursor is reduced. For instance, hydrogen by itself cannot be used in the reduction of low temperature copper-zinc catalysts. These catalysts must be reduced in a very carefully controlled manner. Gas-solid reactions involving heat evolution are subject to a "pyramiding" phenomenon. As reduction of the copper oxide occurs in a thin section of the catalyst bed, at the interface where the reducing gas and catalyst come into contact, large quantities of heat are evolved. A 3900 cubic foot charge of catalyst contains sufficient copper oxide to release 46,800,000 B.t.u. of heat. Some of all of this heat is transferred to both the catalyst mass and the flowing gas. By conduction and convection, the next layer of catalyst is heated to a somewhat higher level than the first section being reduced. Thus, when the first section nears complete reduction, or is completely reduced, and the hydrogen passes into the already heated second section, the released heat from reduction in the second section will add on to its higher level, and heat that section to a still higher temperature level. As this progresses through each succeeding section of the catalyst bed, the temperature of each section becomes progressively hotter until the catalyst reaches a point where it is overheated and irreparably damaged insofar as activity for low temperature shift reactions is concerned. This can be illustrated as follows.

In a commercial adiabatic reactor containing 410 cubic feet of catalyst of Example A hereinafter, hydrogen was introduced into a carrier or diluent gas in the form of purified ammonia synthesis gas from an adjacent plant. The initial hydrogen concentration in the flowing carrier gas was 2.2 to 2.7 percent by volume depending on the analysis used. Within 30 minutes of the time hydrogen was introduced, an unexpected high temperature wave started through the catalyst bed, pyramiding at each incremental depth of catalyst bed, reaching 796° F. at the outlet before the hydrogen could be withdrawn and the temperature lowered with cold natural gas.

It has been found that hydrogen without a diluent deleteriously affects copper-zinc catalysts which are to be used as low temperature shift reaction catalysts. Use of a hydrogen stream in too great a hydrogen concentration brings about a temperature rise. Since the catalysts contain relatively high concentrations of copper oxide, and since the reduction of copper oxide to copper is an exothermic reaction, a large quantity of heat is released. As a consequence, copper-zinc catalysts have not been reduced commercially with hydrogen with any degree of uniformity. The difficulty of controlling the released heat in commercial units with no heat dissipation means results in partial or complete destruction of catalyst activity for the low temperature shift reaction.

An object of this invention, therefore, is to provide a method for reducing the copper oxide-zinc oxide catalyst precursors such that the resulting catalysts possess maximum activity for the reaction $CO+H_2O \rightleftharpoons CO_2+H_2$ when this reaction is carried out at a temperature below 700° F.

The invention in Ser. No. 422,452 provides for the reduction of a copper oxide-zinc oxide catalyst precursor, containing zinc and copper in a ratio of 0.5 to 3 zinc to 1 copper on a weight basis, with an inert gas carrying a small amount of hydrogen. In our earlier application the reduction of the copper oxide-zinc oxide catalyst presursor is accomplished by subjecting the catalyst to an inert gas stream initially containing less than 0.5 percent hydrogen by volume preferably 0.1 to 0.2 percent. The amount of hydrogen in the inert gas stream is then controlled within the range of 0.3 percent to 5 percent, preferably 3 percent, hydrogen to maintain the temperature in a range of 300° F. to 500° F., the increase in temperature being proportional to an increase in hydrogen concentration. While this aspect of the invention obtains, the broader aspects of Ser. No. 422,452, based on laboratory work, require more precise definition. Extensive commercial experience with the process proved the broader aspects to be not sufficiently definitive. The purpose of this application is to illustrate and claim the more specific aspects of Ser. No. 422,452.

The fact that the copper oxide-zinc oxide catalyst precursors are so subject to damage by overheating appeared to indicate that the catalyst could not be reduced to maximum activity in a commercial unit. Since the catalyst has a heat capacity of about 0.2 B.t.u. per pound, or 16 B.t.u. per cu. ft., the elevation in temperature of each cubic foot of catalyst could be as much as 750° F. if all of the heat were confined to the catalyst and liberated nearly instantaneously. This would, of course, destroy the catalyst activity. Conceivably, the hydrogen concentration could be held to such a low level in the diluent gas that the heat released from the reduction would be exactly or nearly equal to the heat dissipation from the system through the reactor walls, but this was estimated to be such a low value that the reduction of commercial charge would be impractical from both the standpoint of cost and time. Alternatively, the reactor design could be changed to a design to effectively dissipate the heat, but here again the cost was considered too great.

The following data show the effect of reduction temperature on the activity of a catalyst prepared according to Example A hereinafter. These reactions were conducted isothermally with 2 percent hydrogen in nitrogen, using 50 cc. of catalyst. Essentially the same results were obtained with 2 percent hydrogen in natural gas (N.G.).

| Reduction Temperature, °F. | Activity Test Conditions | Activity ($K_w$) @ 400° F. | |
| --- | --- | --- | --- |
| | | 2% $H_2$ in $N_2$ | 2% $H_2$ in N.G. |
| 400 | Temperature, 400° F; Gas Stream, 25% CO and 75% $H_2$; Pressure, 150 p.s.i.g.; Space Velocity, 4,500 cu. ft./ hr./cu. ft. catalyst (dry basis). | 11,480 | 11,800 |
| 500 | | 10,700 | 11,200 |
| 600 | | 7,130 | 6,930 |
| 700 | | 6,400 | 6,100 |

The isothermal unit used in obtaining the above data was designed so that a 100 percent hydrogen stream could have been used to reduce the catalyst while still keeping the temperature below 500° F. because it was possible to remove heat from this small unit. Flow rates could be held low and the temperature brought up slowly. This is not true in commercial operation.

The $K_w$ used herein is an activity constant. It is a simplified form of a reaction rate constant of a first order reaction. This constant is discussed in Chemical Process Principles, Part III by Olaf Hougan and K. Watson, John Wiley & Sons, Inc., 1947, and in I & E C, vol. 41, August 1950, p. 1600. As used herein $$K_w = SV_w \log_{10} \frac{1}{1-\text{fraction of theoretical conversion}} =$$

$$SV_w \log_{10} \frac{CO \text{ in} - CO \text{ at equilibrium}}{CO \text{ out} - CO \text{ at equilibrium}}$$

where $SV_w$ is the wet space velocity defined as the total volume of wet gas measured in standard cubic feet (s.c.f.), at 1 atmosphere and 60° F. per hour per cubic foot of catalyst. In other words, this is the time term in the reaction rate constant expression. The CO in the above expression can be expressed in any units so long as the units are consistent for the CO concentration in the inlet, CO in the outlet, and CO at equilibrium. The constant $K_w$ may not adequately express the true mechanism of the shift reaction over the catalyst in mathematical terms. However, it has been found to be a reliable means of expressing the activity from bench scale tests and for designing commercial units.

In accordance with this invention the catalyst is reduced with hydrogen or carbon monoxide in a very carefully controlled manner, using a virtually dry diluent gas, such as nitrogen, methane, propane, or carbon dioxide, none of which react with the catalyst at the reducing temperature. The hydrogen or carbon monoxide reducing gas is introduced at a very low concentration of the magnitude of less than 0.5 percent by volume, preferably 0.1 to 0.2 percent, in order initially to reduce the more active sites of the catalyst, the initiation temperature being at least 250° F., and generally 300° F. to 350° F. In order to reach this initiation temperature the catalyst is preheated. When the hydrogen is virtually all reacted, or when less than 0.01 percent of the hydrogen is present in the outlet following this initial reduction, the concentration of the reducing gas in the diluent gas is increased incrementally until the concentration reaches three volume percent, preferably until it reaches two percent. Here it is held until the catalyst is reduced. By maintaining each incremental increase less than 0.5 volume percent, or at least not exceeding 0.5 percent, the temperature is maintained below 500° F. until the reduction is complete. The reduction of the catalyst bed or mass is deemed complete when there is approximately no change in hydrogen content of the reducing gas stream which is passed through the activated catalyst bed, i.e. when less than ten percent of the hydrogen in the stream is consumed.

Space velocities, that is the volume of gas flowing, under standard conditions of temperature and pressure per unit volume of catalyst per hour, with which we are concerned herein, vary depending on whether the diluent-reducing gas stream is recycled. Normally the space velocity will be in the range of 150 to 3000 volumes of gas as determined at standard conditions (60° F. and one atmosphere) per volume of catalyst per hour. However the space velocity alone is not sufficient to serve as a standard for the catalyst reduction since it is essential that the reducing gas be adequately distributed over the interface of the catalyst bed. Hence, according to the practice of this invention a definite linear velocity must be maintained. The flow quantity and pressure conditions within the above ranges must be such that the superficial linear velocity of gas flow through the reactor is at least 0.05 feet per second, and not more than 1.0 foot per second. In addition the hydrogen or carbon monoxide-diluent gas mixture should be virtually devoid of sulfur or its compounds, since these are poisons for the low temperature shift catalyst. Thus the reducing gas should contain less than one part sulfur compound per million.

Various aspects of this invention can, perhaps, best be understood by reference to the following examples. These examples are included for the purpose of illustration only, since variations will occur to one skilled in the art. Thus the amount of hydrogen in the diluent gas stream will depend on the copper-zinc ratio of the catalyst, and, at times, on occluded oxygen in the converter. The catalyst employed in this and the following examples is a copper zinc catalyst prepared in accordance with the following example.

Example A

In a commercial unit, a copper-zinc catalyst is produced by pumping 565 cubic feet of a solution containing 918 pounds of copper as copper nitrate, and 1890 pounds of zinc as zinc nitrate (specific gravity approx. 1.18) into a 15.7 percent solution of soda ash (light). The volume of the soda ash solution is 450 cu. ft. (theoretical weight of precipitate—3500 lbs.)

The soda ash solution is pumped into a 1695 cu. ft. tank equipped with a mechanical agitator and heated to 140° F. The copper-zinc solution is heated at 110° F., and sprayed over the surface of the soda ash solution. The soda ash solution is maintained at 140° F. to 142° F. during this precipitation reaction by sparging with live steam. The final pH of the mixture is 7.0 to 8.5. After precipitation the batch is washed to remove sodium by decanting off approximately 80 percent of the solution in the precipitation tank. The wash temperature is approximately 90° F. Four washes are used in this decantation as follows: 1st, 595 cu. ft.; 2nd, 1310 cu. ft.; 3rd, 1310 cu. ft; and 4th, 1310 cu. ft. After the fourth decantation the materials are filtered, and then loaded on racks and calcined at 700° F. to a weight loss of 1 percent or less. At this point the sodium content is 0.10 to 0.15 percent. The calcined material is reslurried by suspension in water (3500 lbs. of the oxides in 1695 cu. ft. of water) at 90° F. to 100° F. The resulting mixture is filtered out of the slurry and dried to 1 percent or less weight loss at 352° F. The sodium content at this point is 0.05 percent or less. The dried filter cake to which 2 percent graphite is added as a lubricant is then sized and formed into ¼ inch tablets. Catalyst properties (on reduced pellets): Sodium =0.03%; Surface area=44 m.²/gm.; Pellet size=¼ in.; Pellet density=80 lb./in.³; Pellet crush strength=20 lbs. d.w.l.

The catalyst of Example A was reduced as follows, illustrating the reduction process of this invention.

EXAMPLE 1

In a commercial shift converter 893 cu. ft. of the copper-zinc catalyst prepared by Example A, in the form of 3/16" tablets, were reduced with a nitrogen stream containing hydrogen. In effecting this reduction, a nitrogen gas stream, preheated to 144° F. was passed over the catalyst at a space velocity of 230 cu. ft./hr./cu. ft. catalyst until the catalyst bed temperature reached about 129° F. (inlet temp. 129° F., outlet temp. 129° F.). The nitrogen stream was then modified by the volumetric addition of hydrogen. The hydrogen-containing reduction gas stream was passed through the shift converter for the next nine hours during which time the temperature of the inlet gas stream was gradually increased to 340° F. at the shift converter inlet. When the hydrogen content of the nitrogen stream at the outlet of the shift converter was ascertained by chemical analysis to be 0.01 percent by volume, the hydrogen content of the nitrogen stream at the inlet was increased in 0.1% by volume increments until a level of 1.0% by volume was reached. This required an additional two hours and resulted in a maximum catalyst bed temp. of 401° F. When all conditions were ascertained to be under control, the hydrogen content of the nitrogen stream at the inlet to the shift converter was increased in three increments to 1.8–2.0 percent by volume requiring an additional two hours. These conditions (340° F. inlet, 1.8–2.0% $H_2$) were maintained until such time as the hydrogen content of the nitrogen stream at the shift converter outlet equalled the hydrogen content of the nitrogen stream at the shift converter inlet. At this point the inlet temperature of the nitrogen-hydrogen reducing gas stream was increased to 400° F. and a check was made for evidence of further hydrogen consumption by the catalyst. When the check showed negative, the hydrogen content was incrementally increased to 3.0 and then to 5.5 percent by volume and further checks made for evidence of hydrogen consumption by the catalyst. When these proved negative, the shift converter was then ready to be put on stream. The entire operation required a time period of 39 hours. Data on a commercial carbon monoxide shift conversion in this unit following reduction were as follows:

Operating conditions

| | | |
|---|---|---|
| Inlet temperature | °F | 426 |
| Outlet temperature | °F | 450 |
| Pressure | p.s.i.g. | 286 |
| Steam/gas ratio | | 0.69/1 |
| Space velocity (dry gas) | | 2000 |

Composition of gas streams

| Inlet: | Percent |
|---|---|
| CO | 2.0 |
| Outlet: | |
| CO | 0.15 |

EXAMPLE 2

Plant reduction:

In a commercial shift converter 568 cu. ft. of the copper-zinc catalyst described in Example A, in the form of ¼ inch tablets, were reduced with a natural gas stream containing hydrogen. In effecting this reduction, a natural gas stream, preheated to 200° F. to 500° F., was passed over the catalyst at a space velocity of 400 until the catalyst bed temperature reached about 250° F. The natural gas stream was then modified according to Example 1 by the addition of hydrogen so that it contained about 0.5 percent hydrogen by volume. The hydrogen-containing reduction gas stream was passed through the shift converter during the next twelve hours, gradually increasing the hydrogen content to one percent by volume as in Example 1, thereby raising the catalyst bed temperature to about 465° F. During the next twenty-four hours the hydrogen concentration in the reducing gas stream was gradually raised to 3 to 5 percent by volume at a rate sufficient to maintain the catalyst bed temperature about, but below, 500° F. Throughput of the hydrogen-containing reducing gas at 226,000 standard cubic feet per hour was approximately equal to that in the reducing gas inlet stream. The shift converter was then ready to be put on stream. Data on a commercial carbon monoxide conversion in this unit following the reduction were as follows:

Operating conditions

| | | |
|---|---|---|
| Inlet temperature | °F | 400 |
| Outlet temperature | °F | 445 |
| Pressure | p.s.i.g. | 125 |
| Steam/gas ratio | | 0.42/1 |
| Space velocity (dry gas) | | 1814 |

Composition of gas streams

| Inlet: | Percent |
|---|---|
| $CO_2$ | 0.8 |
| CO | 3.0 |
| $H_2$ | 74.0 |
| $N_2$ | 21.9 |
| $CH_4$ | 0.3 |
| Outlet: | |
| $CO_2$ | 3.8 |
| CO | 0.06 |
| $H_2$ | 74.0 |
| $N_2$ | 22.1 |
| $CH_4$ | 0.3 |

The foregoing examples illustrate that by means of the reduction process of this invention an improvement in activation of low temperature copper-zinc catalysts is obtained. This is effectively demonstrated by reductions following other procedures.

EXAMPLE 3

A plant designed to operate in shift conversion at 450° F. contained the catalyst of Example A. The catalyst was reduced with natural gas containing hydrogen. After initiating the reaction with 0.5 volume percent hydrogen in the gas stream, the quantity of hydrogen was increased in one step to three percent. The bed temperature pyramided to about 630° F. before it could be brought under control. The plant with shift conversion stages designed to operate at 450° F. with 0.2 percent carbon monoxide in the shift conversion effluent operated at 460° F. with a carbon monoxide leakage of 0.32 percent. The catalyst had to be replaced because the product did not have the required purity.

EXAMPLE 4

In the plant of Example 3 the low temperature shift conversion catalyst was replaced with a new charge of 445 cubic feet to convert about 2 percent CO to 0.2 percent or less at 450 F. The catalyst of Example A when reduced with hydrogen in natural gas following Example 2 has operated with less than 0.1 percent CO in the outlet gas stream for over two years at 450° F.

EXAMPLE 5

In a plant designed to operate a shift conversion stage at 450° F., the catalyst of Example A was reduced with steam containing hydrogen. After initiating the reaction with 0.5 volume percent hydrogen in the gas stream, the quantity of hydrogen in the reducing gas stream was increased to three percent in one step. The bed temperature jumped to about 650° F. before it could be controlled. The plant with shift conversion stages designed to operate at 475° F. with 0.75 percent CO in the shift conversion effluent, operated at 475° F. with a CO leakage of 1.08 percent. The catalyst had to be replaced in six months.

Referring again to the process in general, due to the cost of such inert gases as argon and the like, nitrogen is the preferred diluent. However, carbon dioxide, natural gas, ethane, propane and other volatile alkanes can also be used.

It has been found that methane and propane reduce copper oxide-zinc oxide catalysts of the type contemplated herein. In addition carbon dioxide reacts with hydrogen.

Catalyst test conditions:
 Pressure _____ 150 p.s.i.g.
 Temperature _____ 360° F.–400° F.–500° F
 Space velocity _____ 4500 dry gas.
 Steam/gas ratio _____ 1/1.
 Gas stream _____ 25% CO-75% $H_2$.

|  | 360° F. | | | 400° F. | | | 500° F. | | |
|---|---|---|---|---|---|---|---|---|---|
|  | Percent Conv. | Percent CO Leakage | $K_w$ Value | Percent Conv. | Percent CO Leakage | $K_w$ Value | Percent Conv. | Percent CO Leakage | $K_w$ Value |
| Reducing Gas: | | | | | | | | | |
| $H_2$ in $N_2$ | 80.0 | 4.4 | 6,150 | 89.0 | 2.2 | 8,500 | 95.3 | 1.0 | 11,700 |
| $H_2$ in $CO_2$ | 84.3 | 3.6 | 6,700 | 91.3 | 1.8 | 9,300 | 96.3 | 0.8 | 12,750 |

Nevertheless, recent work has shown that if certain conditions obtain, these gases are virtually nonreactive under reducing conditions. The gases can thus be used as diluents by the practice of this invention.

In the case of hydrocarbons, reduction with hydrogen takes place at temperatures below those at which the copper oxide-zinc oxide catalysts are reduced by the hydrocarbons themselves. If the released heat is controlled according to the teachings of this invention, the catalyst is reduced before any substantial reaction with hydrocarbons takes place. Thus as shown by Example 2 saturated volatile hydrocarbons can be used as diluent gases. Chromatographic data show that in most instances the catalyst is not reduced by hydrocarbons until the temperature rises above about 500° F., whereas hydrogen reduction of the catalyst begins at about 210° F. Thus there is a difference between the temperature at which hydrogen reduces and the temperatures at which alkanes reduce the catalyst.

Steam has been classed as a diluent because it can be effectively used as a carrier in the laboratory. However it has now been found that steam as a diluent results in a less active catalyst. As a result, in some plants the shift catalyst has not been sufficiently active. This is illustrated by the following:

Reduction conditions as in Example 1.
Activity data average of 8 tests.
Activity test conditions:
 Temperature _____ 400° F.
 Gas stream _____ 25% CO-75% $H_2$
 Steam/gas ratio _____ 1/1 (vol.)
 Pressure _____ 150 p.s.i.g.
 Space velocity _____ 4500 dry cu. ft./hr.

Reduction:
 Reducing gas— Activity ($K_w$ at 400° F.)
 $H_2$ in $N_2$ _____ 11,630
 $H_2$ in steam _____ 7,450

The data show that steam is not suitable as a reducing gas diluent where high activity is desired.

A gas which can be used in addition to true inerts and hydrocarbons is carbon dioxide. When carbon dioxide is used the reduction reaction is accompanied by a reverse shift reaction. The reverse shift reaction is endothermic. This being the case it appears that a slightly higher reduction temperature is permissible than that used with nitrogen. To illustrate the use of carbon dioxide as a diluent gas in the reduction of copper oxide-zinc oxide low temperature shift catalysts the following is given.

Dry reduction using $N_3$ and $CO_2$ carrier gases

Reduction conditions:
 Pressure _____ 360° F.
 Temperature _____ Atmospheric.
 Space velocity _____ 750.
 Reduction complete when $\Delta H_2/\Delta_t$ and $\Delta CO/\Delta_t$ are constant following Ex. 2 (20 hours)

The foregoing data show that a catalyst reduced with hydrogen in carbon dioxide as a diluent gas compares favorably with those using nitrogen as the carrier gas.

As set forth in copending application Ser. No. 330,542, filed Dec. 16, 1963, carbon monoxide can be used as a reducing gas as well as hydrogen. With carbon monoxide as the reducing gas, care must also be exercised to insure that the heat released does not ruin the catalyst. Any of the foregoing diluent gases can be used with carbon monoxide as reducing gases. Thus, for example, reduction of the catalyst mass with carbon monoxide will ocur prior to any reduction with an alkane, such as methane. Carbon monoxide with carbon dioxide as the diluent gas can also be employed. Usually it is preferred to employ nitrogen as the diluent gas for carbon monoxide.

Ammonia synthesis gas, further diluted with nitrogen is a desirable gas when employed according to the teachings of this invention. Ammonia synthesis gas is a mixture of nitrogen and hydrogen in a ratio of three volumes of hydrogen to one volume nitrogen. It can be further diluted with nitrogen before it is passed through the catalyst mass. Thus given the teachings of this invention several modifications will occur to one skilled in the art. For instance any source of hydrogen or carbon monoxide can be used so long as it is combined with one or a mixture of the diluent gases as set forth herein. In addition since, as shown, steam is not completely ineffective, some steam can be tolerated. The reducing-diluent gas mixtures contemplated can have up to forty percent steam in admixture therewith by volume. In another embodiment of the invention, as illustrated in some of the examples, it will frequently be desirable to preheat the catalyst prior to contacting it with a reducing gas. The catalyst mass can be preheated with one of the diluent gases or other means when this embodiment is employed. Ramifications such as these, and various hydrogen concentrations within the ranges set forth are deemed to be within the scope of this invention.

What is claimed is:

1. A process for reducing a zinc oxide-copper oxide catalyst having a weight ratio of 0.5 to 3 parts zinc for each part of copper, which comprises:
 preheating the catalyst to a temperature within the range of 250 to 350° F.,
 passing a gaseous mixture over the preheated catalyst, said gaseous mixture comprising a diluent gas which is inert to said catalyst and a concentration of from about 0.1 to 0.5 percent by volume of a reducing gas selected from the group consisting of hydrogen and carbon monoxide,
 maintaining said concentration until said reducing gas is substantially completely reacted in passing over the catalyst,
 increasing the concentration of said reducing gas in said gaseous mixture by increments not greater than 0.5 percent by volume until the concentration increases to 3 percent by volume so as to maintain the temperature below 500° F. until the reaction is substantially completed.

2. A process according to claim 1 wherein the concentration of said reducing gas in said gaseous mixture is increased by increments not greater than 0.5 percent by volume until the concentration increases to 2 percent by volume.

3. A process according to claim 1 wherein said inert diluent gas is selected from the group consisting of nitrogen, methane, ethane, propane and carbon dioxide.

4. A process according to claim 3 wherein the reducing gas in said gaseous mixture is hydrogen.

5. A process according to claim 4 wherein the reducing gas in said gaseous mixture is carbon monoxide.

6. A process according to claim 1 wherein said gaseous mixture contains from about 0.1 to 0.2 percent by volume of said reducing gas and is passed over the preheated catalyst at a superficial linear velocity of 0.5 to 1.0 ft./sec.

7. A process for reducing a zinc oxide-copper oxide catalyst having a weight ratio of 0.5 to 3 parts zinc for each part of copper, which comprises:
preheating the catalyst to a temperature within the range of 300 to 350° F.,
passing a gaseous mixture over the preheated catalyst at a superficial linear velocity of 0.05 to 1.0 ft./sec. so as to cause an initial reduction of said catalyst, said gaseous mixture comprising a diluent gas which is inert to said catalyst and a concentration of from about 0.1 to 0.5 percent by volume of hydrogen,
maintaining said concentration of the gaseous mixture until less than 0.01 percent of hydrogen is present in said mixture after said initial reduction,
increasing the concentration of hydrogen in said gaseous mixture by increments not greater than 0.5 percent by volume until the concentration increases to 2 percent by volume so as to maintain the temperature below 500° F. until less than 10 percent by volume of hydrogen present in said mixture is consumed by the reduction reaction.

8. A process according to claim 7 wherein said inert diluent gas is selected from the group consisting of nitrogen, methane, propane, carbon dioxide and natural gas.

References Cited

UNITED STATES PATENTS

| 1,797,426 | 3/1931 | Larson | 23—213 |
| 1,908,696 | 5/1933 | Dodge | 252—475 |
| 2,103,219 | 12/1937 | Jeness | 23—213 |
| 2,275,181 | 3/1942 | Ipatieff et al. | 252—475 |
| 3,303,001 | 2/1967 | Dienes | 252—475 |

FOREIGN PATENTS

| 311,737 | 9/1930 | Great Britain. |
| 636,800 | 5/1950 | Great Britain. |
| 835,751 | 5/1960 | Great Britain. |

DANIEL E. WYMAN, *Primary Examiner.*

P. KONOPKA, *Assistant Examiner.*